No. 674,903. Patented May 28, 1901.
H. CALLAWAY.
CLOSING TUBE ENDS.
(Application filed Sept. 22, 1900.)
(No Model.)

Witnesses
A. M. Parkins.
E. A. Bulloch.

Inventor:
Hugh Callaway,
By his Attorneys,
Baldwin, Davidson & Wight

THE NORRIS PETERS CO., PHOTO-LITHO., WASHINGTON, D. C.

UNITED STATES PATENT OFFICE.

HUGH CALLAWAY, OF GUILDFORD, ENGLAND.

CLOSING TUBE ENDS.

SPECIFICATION forming part of Letters Patent No. 674,903, dated May 28, 1901.

Application filed September 22, 1900. Serial No. 30,801. (No model.)

*To all whom it may concern:*

Be it known that I, HUGH CALLAWAY, engineer, a subject of the Queen of Great Britain, residing at Guildcroft, Guildford, in the county of Surrey, England, have invented certain new and useful Closing Tube Ends and other Holes, of which the following is a specification.

It has before been proposed to close tube ends and other holes by means of a flanged plug just small enough to pass into the tube end or hole, which is internally flanged, a tight joint being made against internal pressure by a short cylindrical ring of copper or other soft metal in the cylindrical space bounded by the two flanges, the bore of the tube or hole, and the body of the plug. This arrangement has serious objections, it being difficult to get the copper ring into place, for as it is larger than the tube end or hole it has to be expanded by a special tool after it is put in, and it is also liable to shearing between the edges of the flanges of the tube end or hole and of the plug.

According to this invention the inside of the tube end or hole is slightly conical or curved, decreasing in diameter outward, and it is closed by a similarly-shaped plug. The base or larger end of the plug is just small enough to allow it to pass into the tube or hole from the outside, and between the plug and the tube there is an expanded ring or tube of soft metal, such as copper, extending to the outer end of the tube or hole. The ring before it is expanded is just small enough to allow it to pass into the tube or hole from the outside, and it is expanded by drawing the plug outward into it. Preferably the ring is slightly flanged, so as to prevent it from entering too far into the tube or hole, and the plug is provided with a screw-stem and is drawn outward and the ring expanded by a nut on the screw working against a washer bearing on the flange of the ring.

Figure 1:
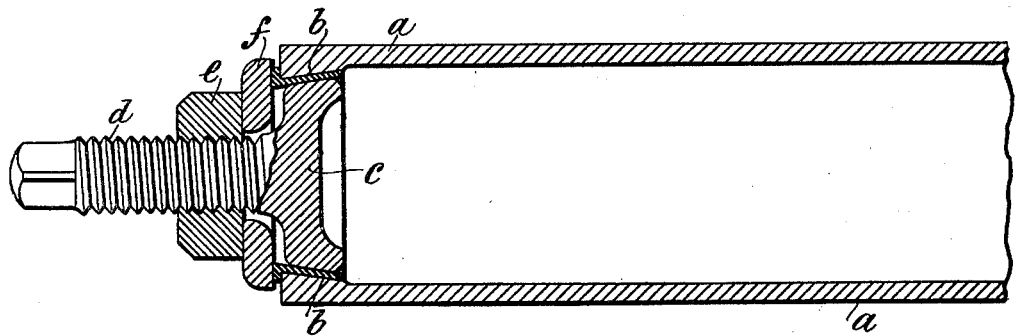
Figure 3:
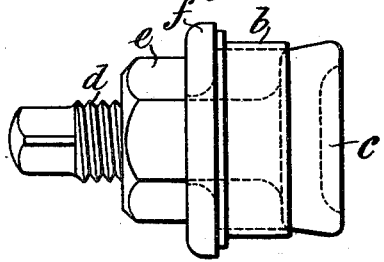
Figure 2:

Figure 1 is a longitudinal section of a tube having its end closed according to this invention, and Fig. 2 is a longitudinal section of the copper ring $b$. Fig. 3 shows an assemblage of the members of the joint ready to be inserted into the tube.

$a$ is the tube; $b$, the copper ring; $c$, the plug, with a screw-stem $d$, having on it the nut $e$ and washer $f$.

When it is desired to close the end of the tube $a$, the ring $b$ is placed between the plug $c$ and the washer $f$ and is so held by the nut $e$, as is shown in Fig. 3. This assemblage is inserted into the tube, and the nut $e$ is screwed upon the stem $d$, drawing the plug $c$ outward and expanding the ring $b$, so making a tight joint, as shown in Fig. 1.

What I claim is—

1. The combination of a tube end or other hole gradually decreasing in diameter outward, a ring of soft metal whose original diameter is less than the smallest diameter of the hole, but which is stretched or expanded radially in all directions throughout its periphery to closely fit the hole, and a plug shaped similarly to the hole closely fitting the inside of the ring.

2. The combination of a tube end or other hole gradually decreasing in diameter outward, a ring of soft metal inside the hole, a similarly-shaped plug inside the soft-metal ring, means for drawing the plug outward into the ring to expand it and means for pressing on the outer end of the soft-metal ring to hold it in the hole while being expanded.

3. The combination of a tube end or other hole, circular in cross-section, gradually decreasing in diameter outward, a similarly-shaped ring of soft metal fitting into the hole, and a similarly-shaped plug fitting inside the soft-metal ring, an outwardly-projecting flange on the outer end of the soft-metal ring, a screw-stem on the plug, a washer on the screw-stem and bearing against the flange, and a nut on the screw-stem bearing against the washer.

4. The combination of a tube end or other hole gradually decreasing in diameter outward, a ring of soft metal whose original diameter is less than the smallest diameter of the hole, but which is stretched or expanded radially in all directions throughout its periphery to closely fit the hole, an outwardly-projecting flange on the outer end of the soft-metal ring to limit its movement inwardly when being inserted, and a plug shaped similarly to the hole fitting closely inside the ring.

HUGH CALLAWAY.

Witnesses:
FREDK. C. WEATHERBY,
WALTER J. SKERTEN.